P. LEDGER.
BARRETTE.
APPLICATION FILED AUG. 26, 1909.

946,058.

Patented Jan. 11, 1910.

Witnesses:
Arthur E. Zumpe.
W. R. Schulz.

Inventor
Philip Ledger
By his Attorney
Frank V. Briesen

UNITED STATES PATENT OFFICE.

PHILIP LEDGER, OF LEOMINSTER, MASSACHUSETTS.

BARRETTE.

946,058.　　　　　Specification of Letters Patent.　　Patented Jan. 11, 1910.

Application filed August 26, 1909.　Serial No. 514,703.

*To all whom it may concern:*

Be it known that I, PHILIP LEDGER, a citizen of the United States, residing at Leominster, Worcester county, State of Massachusetts, have invented new and useful Improvements in Barrettes, of which the following is a specification.

This invention relates to a barrette or hair retainer of novel construction, and has for its object more particularly to so reinforce the tongue-retaining hook that it is not liable to be broken off even under severe strain.

Figure 1:
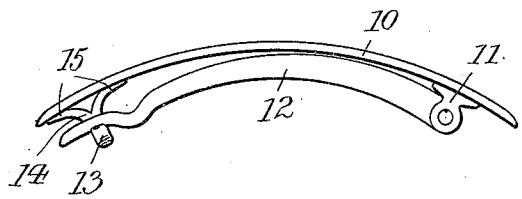
Figure 2:
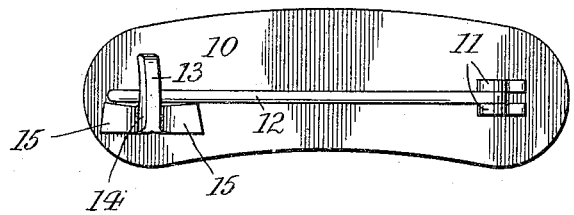
Figure 3:
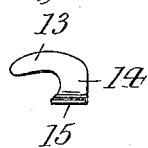
Figure 4:
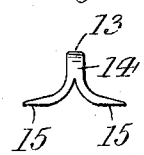

In the accompanying drawing: Figure 1 is a side view of my improved barrette; Fig. 2 an inner view thereof; Fig. 3 an end view of the hook or keeper, and Fig. 4 a rear view thereof.

To the concave face of a curved back plate or barrette proper 10 there is hinged in bearings 11 a tongue or pin 12. The free end of this tongue is adapted to be engaged by a hook or keeper composed of a solid beak 13, and a shank 14, integral with said beak. This shank is split up longitudinally from the beak downward, and the two legs thus formed are deflected from each other at an acute angle, so as to become spaced and form an intervening triangular gap. The base of each leg is turned outward to obtain an extensive bearing surface or sole 15 which is flattened to conform to the contour of plate 10. The keeper is cemented to plate 10 in such a position that while beak 13 extends at right angles to tongue 12, the outwardly turned soles 15 extend in substantial parallelism therewith.

It will be seen that the keeper, constructed as described, has an extended attaching surface, while the two diverging legs constitute, in effect, braces that resist any lateral thrust on the beak. In this way the keeper is securely connected to the plate and is not liable to be wrenched or broken off even under excessive strain.

I claim:

A barrette comprising a curved back plate, and a keeper composed of a solid beak, and an integral split shank having a pair of spaced legs which are deflected from each other from the beak toward their base, thus forming an intervening gap.

Signed by me at Leominster, Mass., this 24th day of August, 1909.

PHILIP LEDGER.

Witnesses:
　P. H. KILLELEA,
　ALICE A. SPAULDING.